M. KENNEDY.
CAR AXLE AND WHEELS.
APPLICATION FILED MAY 7, 1915.
1,149,836.
Patented Aug. 10, 1915.
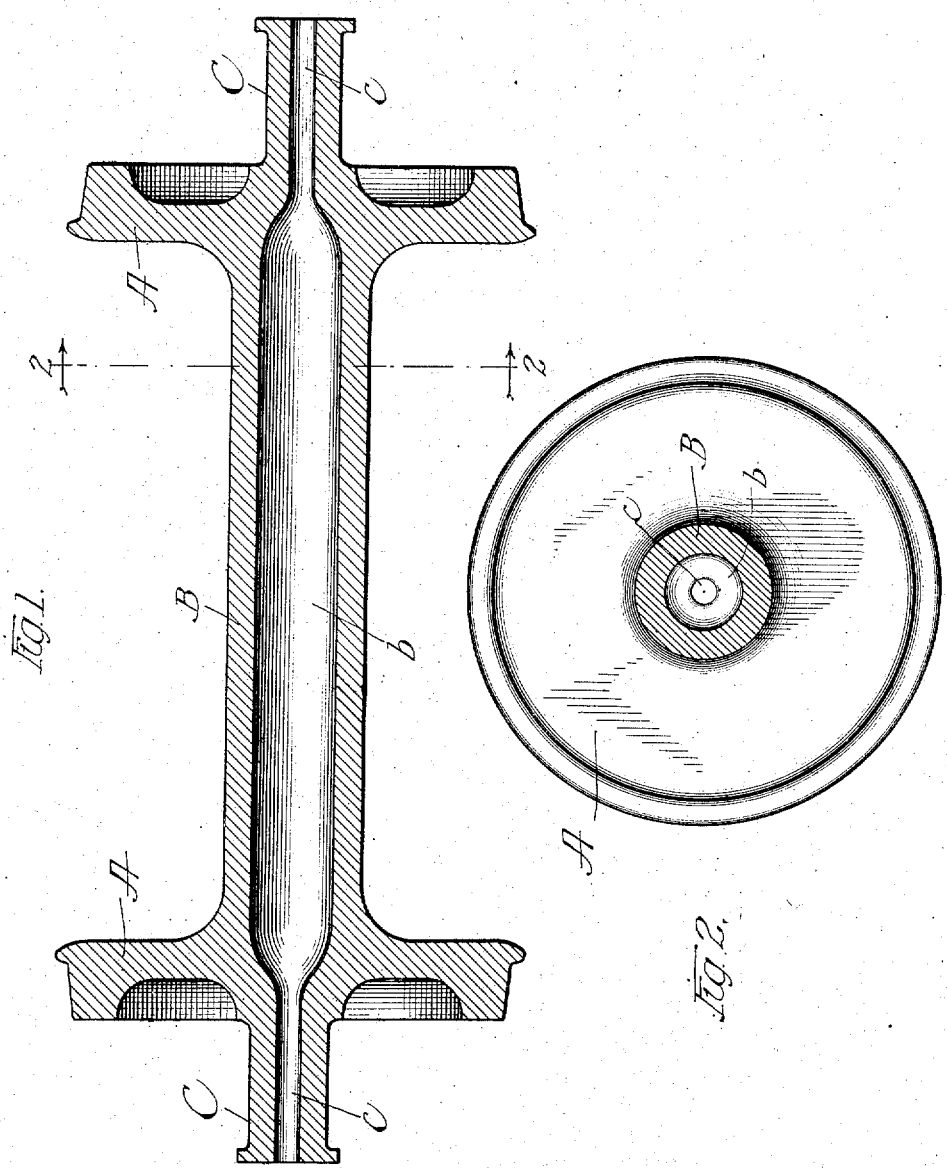

UNITED STATES PATENT OFFICE.

MARTIN KENNEDY, OF CHICAGO, ILLINOIS, ASSIGNOR OF ONE-THIRD TO JOHN G. BODENSCHATZ, OF CHICAGO, ILLINOIS.

CAR AXLE AND WHEELS.

1,149,836.  Specification of Letters Patent.  Patented Aug. 10, 1915.

Application filed May 7, 1915. Serial No. 26,457.

*To all whom it may concern:*

Be it known that I, MARTIN KENNEDY, a citizen of the United States of America, and resident of Chicago, Cook county, Illinois, (residence address 6610 Woodlawn avenue,) have invented a certain new and useful Improvement in Car Axles and Wheels, of which the following is a specification.

My invention relates to car wheels which are cast integral with the axle and journals thereof.

The object of my invention is to provide an improved construction and arrangement which will tend to give maximum strength without objectionably increasing the weight, which will tend to prevent breakage of the axle, particularly where the axle is integrally united with the inner sides of the wheels, and which will also provide an air chamber of ample size within the axle, as will hereinafter more fully appear.

To these and other useful ends my invention consists in matters hereinafter set forth and claimed.

In the accompanying drawings—Figure 1 is a longitudinal section of a pair of car wheels and axle therefor all cast in one integral piece of steel or other suitable metal. Fig. 2 is a cross section on line 2—2 in Fig. 1.

As thus illustrated, my invention comprises a pair of car wheels A integrally connected by the cylindric and tubular axle B and provided with the projecting journals C at opposite ends of said axle. The wheels and axle and journals thereof are all cast in one integral piece of steel, the axle being bored out or formed with a longitudinal bore or chamber $b$ which is contracted at its ends in the wheels, and which is provided with extensions $c$ through the journals. It will be seen that the axle B is of greater diameter than the journals C, and with the tubular formation the weight need not be substantially greater, and may perhaps be less, than the ordinary car wheels and solid axle.

With the wheels and axle journals all cast integral, the expense of forcing the wheels on to solid axles is avoided. Furthermore, the danger of cracking the wheels is avoided, which under the old method was sometimes very serious. For example, in many cases the wheels were seemingly properly applied to the axle, but in reality with invisible cracks which were liable to cause trouble after the wheels and axle were put into use on a car. When forced on to a solid axle the wheels are under strain and if there are weak spots in the metal breakage is liable to occur at any time. But with the wheels and axle and journals all cast integral the wheels are under no tension or strain and many advantages are gained thereby, as will be readily understood by those skilled in the art.

With the hollow or tubular formation of the axle, the oil in one journal box can flow through the axle to the other journal box, and vice versa, thus equalizing the lubrication, and this action will take place when the car tilts to either side. Moreover, the bore through the axle allows the air to pass through, tends to distribute the vibration, and is beneficial in other ways. As the axle is of greater diameter than usual between the wheels, the rigidity and strength are much greater, as the increased diameter brings the axle closer to the tread of the wheel.

With the foregoing construction it will be seen that the axle B is truly tubular in form, and that its bore or air chamber $b$ has a diameter which is much greater than the thickness of the walls of the axle. This increased diameter of the axle, with the tubular formation thereof, insures great strength with practically a minimum of weight, and tends to prevent breakage between the wheels. Also, it will be seen that the inner sides of the wheels are flush, as there are no hollows or depressions therein, the webs of the wheels being set inward and in line with the flanges of the wheels. With this construction, the metal of the axle is expanded at each end thereof into the flush inner side or surface of the adjacent wheel, whereby there is no acute angle between the wheel and axle at the point where they are united. In other words, each end of the axle is slightly flared into the adjacent wheel, and thus breakage is strongly resisted at a point where the strain is always very great. As the axle is of greater diameter than the journals, whereby the hub of each wheel is of much greater diameter inside the wheel than outside thereof, it follows that a bracing effect is obtained for the wheels, and that lateral thrust on the wheels will not be as liable to result in breakage. For, with the construction shown and described, the end portions of the axle are brought much closer to the flanges of the wheels than has heretofore been the practice, and the shorter the distance between the flanges and the sides of the axle the greater the strength.

What I claim as my invention is:—

1. A pair of metal car wheels, cylindric outside journals cast integral with said wheels, and a tubular axle cast integral with said wheels, said axle being of greater diameter than said journals to resist breakage when the wheels are subject to lateral strain by side thrust on the rails.

2. A pair of metal car wheels, cylindric outside journals cast integral with said wheels, and a tubular axle cast integral with said wheels, said axle being of greater diameter than said journals to resist breakage when the wheels are subject to lateral strain by side thrust on the rails, said journals having axial bores of less diameter than the bore of said tubular axle, and the diameter of the air chamber thus formed being greater than the thickness of the walls of said axle.

3. A pair of metal car wheels, cylindric outside journals cast integral with said wheels, and a tubular axle cast integral with said wheels, said axle being of greater diameter than said journals to resist breakage when the wheels are subject to lateral strain by side thrust on the rails, said wheels having flush inner sides into which the metal of said axle is expanded to prevent breakage where the axle and wheels unite.

Signed by me at Chicago, Illinois, this 4th day of May 1915.

MARTIN KENNEDY.

Witness:
ROSE E. SEHNEM.

Copies of this patent may be obtained for five cents each, by addressing the "Commissioner of Patents. Washington, D. C."